Figure 1:
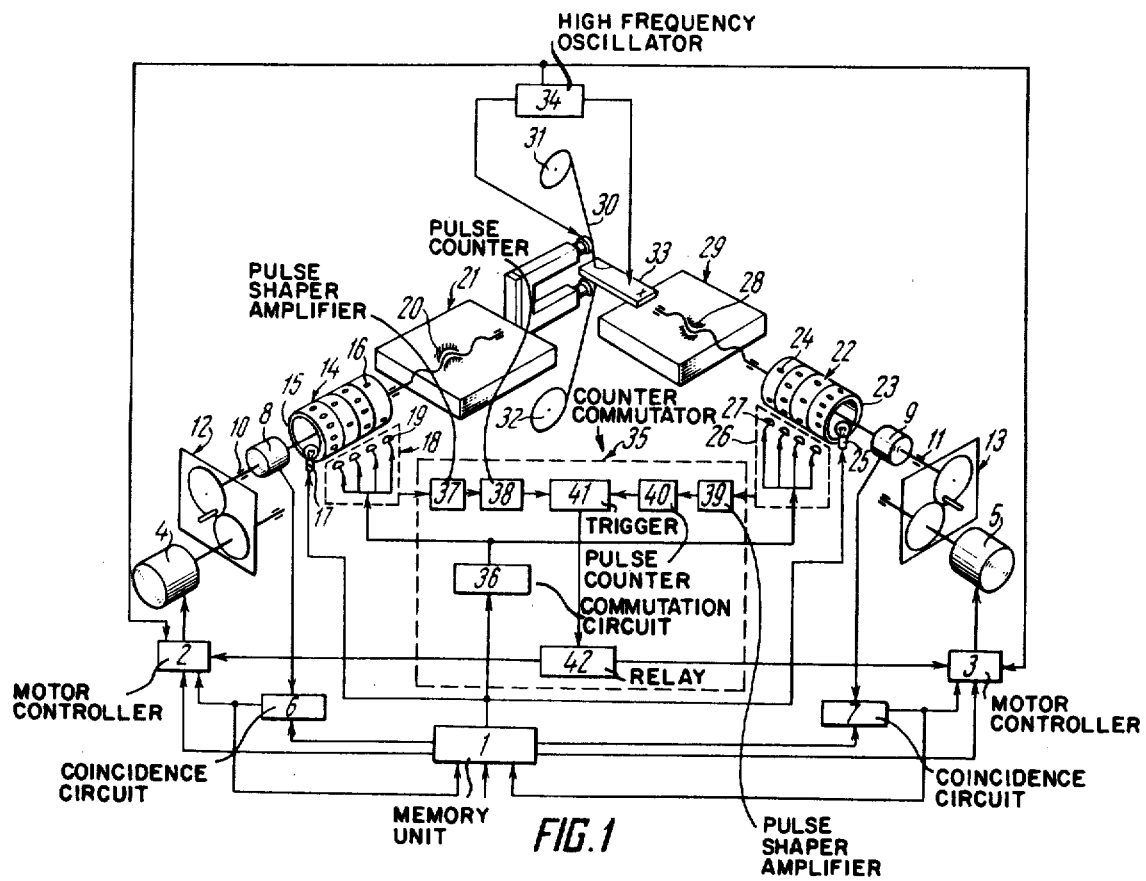

United States Patent [19]

Lavrentiev et al.

[11] 4,051,422
[45] Sept. 27, 1977

[54] PROGRAMMING APPARATUS FOR ELECTROEROSION CUTTING MACHINE

[76] Inventors: Konstantin Nikitich Lavrentiev, ulitsa Dzerzhinskogo, 23, kv. 8; Natalya Isaakievna Borisova, Piskarevsky prospekt, 40, kv. 82; Jury Ivanovich Vasiliev, Menshikovsky prospekt, 19, kv. 56; Jury Nikolaevich Rodionov, Tallinskoe shosse, 54, kv. 61; Vadim Konstantinovich Strashinsky, ulitsa B.Zelenina, 26, kv. 24; Vladimir Fedorovich Ioffe, Kirovsky prospekt, 69/71, kv. 5, all of Leningrad, U.S.S.R.; Iosif Yakovlevich Vyatskin, deceased, late of Leningrad, U.S.S.R., by Itta Moiseevna Vyatskina, administrator

[21] Appl. No.: 623,072

[22] Filed: Oct. 16, 1975

[51] Int. Cl.[2] ............................................. G05B 19/24
[52] U.S. Cl. .................................... 318/570; 318/39
[58] Field of Search ............... 318/569, 570, 601, 625, 318/85, 575, 39

[56] References Cited

U.S. PATENT DOCUMENTS

| 3,585,480 | 6/1971 | Kirkpatrick | 318/569 |
| 3,701,888 | 10/1972 | McDaniel | 318/569 X |
| 3,825,735 | 7/1974 | Bowers et al. | 318/569 X |
| 3,875,468 | 4/1975 | Yagi et al. | 318/575 |
| 3,974,432 | 8/1976 | Thompson | 318/569 |

Primary Examiner—Robert K. Schaefer
Assistant Examiner—John J. Feldhaus
Attorney, Agent, or Firm—Haseltine, Lake & Waters

[57] ABSTRACT

A programming apparatus for an electroerosion cutting machine with two jig tables displaced by motion screw comprising: a counter-commutator controlling motors in the course of machining piece sectors tilted with respect to coordinate axes; pulse angular displacement sensors, each having an element sensing the revolutions of the respective motion screws and mounted together with the latter on the same roll; and sensors reacting to the actions produced by said element due to the revolutions of the respective motion screw.

1 Claim, 2 Drawing Figures

PROGRAMMING APPARATUS FOR ELECTROEROSION CUTTING MACHINE

The present invention relates to a progamming apparatus for twin — jig cutting machines and in particular to a programming apparatus for an electroerosion cutting machine used to cut complex shaped pieces out of electrically conducting and semi-conductor materials.

Known in the art is a programming apparatus for an electroerosion cutting machine in which a first position code transmitter of a first jig table is coupled mechanically to a first motion screw moving the first jig table along the first coordinate direction and to the output of a first motor whose input is connected electrically to the output of a first motor controller, a second position code transmitter of a second jig table is coupled mechanically to a second motion screw moving the second jig table along the second coordinate direction and to the output of a second motor whose input is electrically connected to the output of a second motor controller, while the outputs of a first and a second coincidence circuits are connected to a second and a first inputs of an input memory unit respectively, the outputs of the coincidence circuits being also connected to the first inputs of the first and the second motor controllers, while the second inputs of the latter are connected to a third and a fourth outputs of the input memory unit respectively and the output of the first position code transmitter of the first jig table is connected electrically to the second input of the first coincidence circuit, the output of the second position code transmitter of the second jig table is connected electrically to the second input of the second coincidence circuit, while the third input of the input memory unit serves to receive the programme carrier.

This programming apparatus allows an electroerosion cutting machine to cut pieces out of a metal blank placed onto the first jig table which moves along the first coordinate direction, the pieces having sections both parallel and tilted to the coordinate axes. The metal blank in this case is machined with the use of an electroerosion tool fixed on the second jig table which moves along the second coordinate direction.

When the tool cuts those sectors of the piece which are parallel to the coordinate axes the programme carrier in the input memory unit will use instructions specifying the coordinates of only the starts and the finishes of such sectors.

In case of piece sectors tilted with respect to the coordinate axes the programme carrier would have to contain a considerable amount of instructions specifying the coordinates of starts and finishes of a lot of small sectors that are parallel to the coordinate axes and form steps approximating the required tilted sector to a certain degree of accuracy.

This constitutes a major drawback of the known programming apparatus for an electroerosion cutting tool since the use of a voluminous programme required to machine tilted sectors calls for expensive interpolators and makes it necessary to record a considerable amount of instructions on the programme carrier, which reduces the speed of machining tilted sectors of the piece and the reliability of operation of the system.

The object of the present invention is to provide a programming apparatus for an electroerosion cutting machine whose circuit arrangement and design features would allow it to control the machining of tilted sectors of pieces without requiring that the programme carrier should contain a considerable amount of instructions and without using expensive interpolators.

In accordance with the above and other objects the essence of the present invention consists in that in the programming apparatus for an electroerosion cutting machine in which a first position code transmitter of a first jig table of the machine is coupled mechanically to a first motion screw moving the first jig table along the first coordinate direction and to the output of a first motor the input of which is connected electrically to the output of a first motor controller; a second position code transmitter of a second jig table of the machine is coupled mechanically to a second motion screw moving the second jig table along the second coordinate direction and to the output of a second motor the input of which is connected electrically to the output of a second motor controller, while the outputs of a first and a second coincidence circuits are connected to a first and to a second inputs of the input memory unit, these outputs being connected also to a first inputs of the first and second motor controllers respectively, while second inputs of the controllers are connected to a third and to a fourth inputs of the input memory unit respectively and the output of a first position code transmitter of the first jig table is connected electrically to the second input of the first coincidence circuit, the output of a second position code transmitter of the second jig table is connected electrically to the second input of the second coincidence circuit, while the third input of the input memory device serves to receive the programme carrier, there are provided, according to the invention, a first and a second pulse angular displacement transmitters each positioned between the respective position code transmitter of the respective jig table and the respective motion screw and mounted together with the latter on the same roll; and a counter-commutator comprising a first pulse shaper-amplifier and a first pulse counter connected in series, a second pulse shaper-amplifier and a second pulse counter connected in series, a trigger having two inputs connected to the outputs of the first and the second pulse counters respectively, an output relay having its input connected to the output of the trigger, and a commutation circuit; while each pulse angular displacement transmitter uses an element sensing the revolutions of the respective motion screw and converting them into actions and a number of sensors that react to these actions and the number of which is equal to that of digits in the respective pulse counter-commutator, while the number of actions produced by the element sensing the revolutions of the respective motion screw as per one revolution of the motion screw is different for every sensor, the outputs of all sensors in the first pulse angular displacement transmitter are connected to the input of the first pulse shaper-amplifier of the counter-commutator, the outputs of all sensors in the second pulse angular displacement transmitter are connected to the input of the second pulse shaper-amplifier of the counter-commutator, while the inputs of all sensors of the first and the second pulse angular displacement transmitters are connected to the output of the commutation circuit in the counter-commutator the input of which is connected to a fifth output of the input memory unit, while the outputs of the relay in the counter-commutator are connected to the third inputs of the first and the second motor controllers respectively.

The purposed programming apparatus for an electroerosion cutting machine can be used to control the process of cutting a blank of any conducting material into shaped pieces with the use of an unshaped electrode (a wire).

The proposed programming apparatus for an electroerosion cutting machine makes it possible to machine tilted sectors of a piece automatically while the programme carrier has to contain only those instructions which correspond to the corrdinates of starts and finishes of given tilted sectors and to the tilt angle of the particular sectors with respect to the coordinate axes, thus increasing the speed of machining the tilted sector of the piece.

Figure 2:
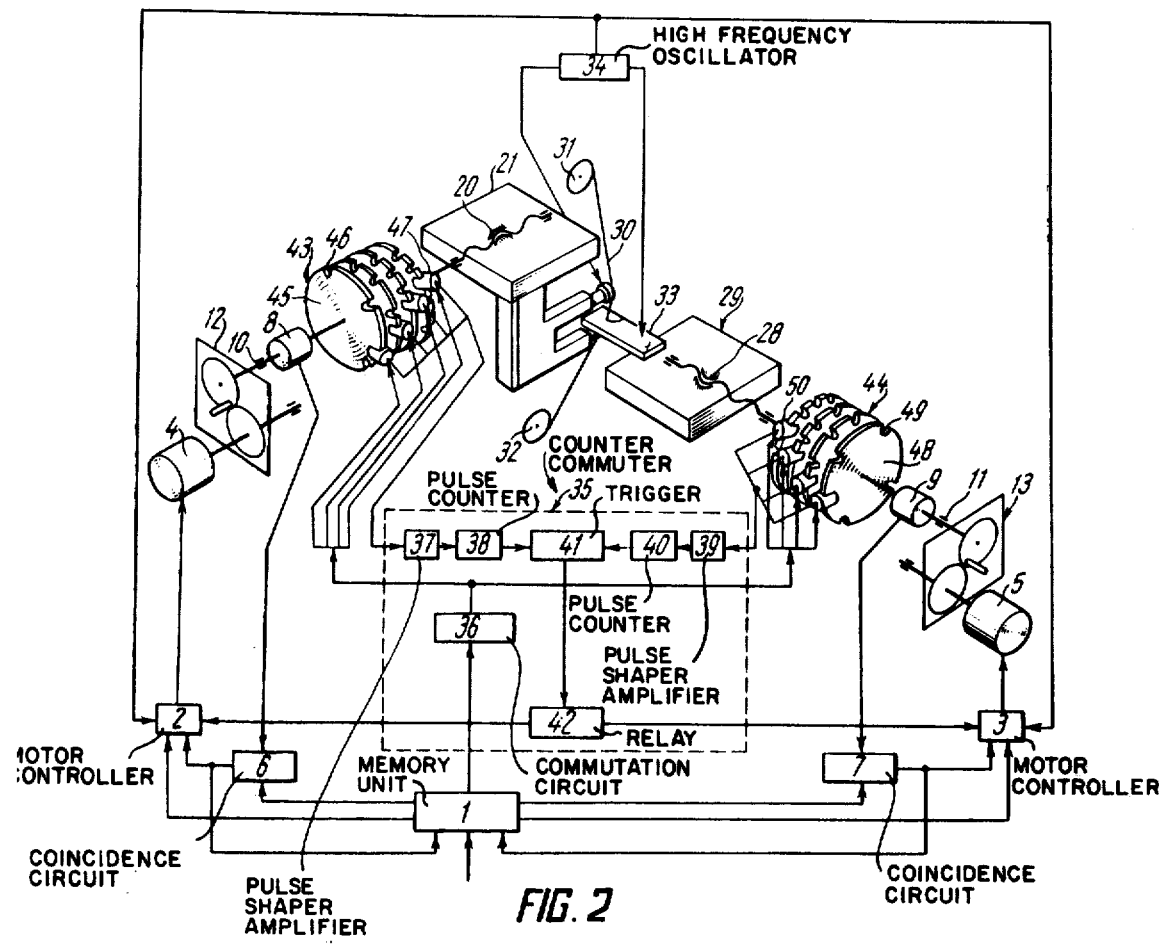

The invention will be better understood from the following description of its embodiments given by way of example and in reference with the accompanying drawings, in which:

FIG. I presents a functional diagram of the proposed programming apparatus for an electroerosion cutting machine provided with one version of pulse angular displacement transmitters according to the invention, FIG. 2 presents a functional diagram of the proposed programming apparatus for an electroerosion cutting machine provided with another version of pulse angular displacement transmitters, according to the invention.

Consider the design of the programming apparatus for an electroerosion cutting machine in more details.

The programming apparatus for an electroerosion cutting machine presented in FIG. I is provided with an input memory unit I serving to receive the programme carrier and to output instructions which is arranged as a contact reader according to a known design (see, for instance, FRG patent No. 1917070). The input memory unit has three inputs and five outputs. The first input of the unit memory unit I serves to receive the programme carrier in the form of a punched tape with a programme recorded on it.

A first motor controller 2 and a second motor controller 3 are designed according to a known contact circuit using relays which switch on and off a first and a second motors 4 and 5. Connected to the first input of the first motor controller 2 is the first output of the input memory unit I. The output of the first motor controller 2 is connected electrically to the input of the first motor 4.

Connected to the first input of the second motor controller 3 is the second output of the input memory unit I. The output of the second motor controller 3 is connected electrically to the input of the second motor 5.

The functions of the motors 4 and 5 are performed by widely known inertialess electric motors.

A first coincidence circuit 6 and a second coincidence circuit 7 are arranged as well known contact circuits also using relays and having inputs the number of which corresponds to that of the digits in the codes of the required and of the current positions of jig tables.

Connected to the first input of the first coincidence circuit 6 is the third output of the input memory unit I. The output of the coincidence circuit 6 is connected to the second input of the first motor controller 2 and to the second input of the input memory unit I.

The first input of the second coincidence circuit 7 is connected to the fourth output of the input memory unit I while the output of this coincidence circuit 7 is connected to the second input of the second motor controller 3 and to the third input of the input memory unit I.

A first position transmitter 8 of the first jig table and a second position transmitter 9 of the second jig table are provided with electrical signal outputs. The output of the first position transmitter 8 of the first jig table is connected to the second input of the first coincidence circuit 6 while the output of the second position code transmitter 9 of the second jig table is connected to the second input of the second coincidence circuit 7.

The first position code transmitter 8 of the first jig table is made as a drum mounted on a roll 10 and provided with a certain amount of tracks the number of which corresponds to that of digits in the code specifying the current position of the first jig table.

The second position code transmitter 9 of the second jig table is also made as a drum mounted on a roll II and provided with a certain amount of tracks the number of which corresponds to that of digits in the code specifying the current position of the second jig table.

The functions of these code transmitters 8 and 9 can be performed by both contacting and noncontacting transmitters.

The output roll of the first motor 4 is coupled mechanically to the roll 10 through a step-down reduction gear while the output roll of the second motor 5 is coupled mechanically to the roll II through a step-down reduction gear 13.

Mounted also on the roll 10 is a first pulse angular displacement transmitter 14.

The first pulse angular displacement transmitter 14 is made as a noncontacting pulse phototransmitter provided with a hollow drum 15 with four tracks located on the circumference of the drum 15. The tracks have different numbers of holes 16 made in the wall of the drum 15. The number of holes 16 in a track is determined by the digit of the binary code to which the given track corresponds on the drum 15. Located at one side of the drum 15 is an illuminator 17. Placed along the wall of the drum at its other side is a unit 18 of sensors 19.

Every sensor 19 is positioned opposite a respective track of the drum 15 and is made around a photodiode. The functions of a sensor 19 can be performed also by a phototransistor.

The number of sensors 19 corresponds to that of tracks on the drum 15 and in this particular design there are four sensors.

The roll 10 bearing the first position code transmitter 8 of the first jig table and the first pulse angular displacement transmitter 14 fixed on it has a rigid mechanical coupling with a first motion screw 20 which moves a first jig table 21 along the first coordinate direction.

A second pulse angular displacement transmitter 22 is mounted on the roll II and is made as a noncontacting pulse phototransmitter provided with a hollow drum 23 with four tracks located on the circumference of the drum 23. The tracks have different numbers of holes 24 made in the wall of the drum 23. Located at one side of the drum 23 is an illuminator 25. Placed along the wall of the drum at its other side is a unit 26 of sensors 27.

Every sensor is positioned opposite the respective track on the drum 23 and is made around a photodiode. The functions of the sensor 27 can be performed also by a phototransistor.

The number of sensors 27 corresponds to that of tracks on the drum 23 and in this particular case there are four tracks.

The roll II bearing the second position code transmitter 9 of the second jig table and the second pulse angular displacement transmitter 22 fixed on it has a rigid mechanical coupling with the second motion screw 28 which moves the second jig table along the second coordinate direction.

Assemblies that sense the revolutions of the motion screws 20 and 28 and convert these revolutions into visual light actions for the first pulse angular displacement transmitter 14 and for the second pulse angular displacement transmitter 22 are the drum 15 with holes 16 and the drum 23 with holes 24 respectively.

Secured on the first jig table 21 is an electrode tool made as a small diameter wire 30 which is wound continuously from one bobbin 31 onto another bobbin 32 and which serves as the first electrode.

The second jig table 29 bears a piece 33 to be machined which serves as the second electrode. The functions of an electric spark generator are performed by a high frequency oscillator 34 the output of which is connected between the first electrode (the small diameter wire 30) and the second electrode (the piece 33 to be machined).

The programming apparatus for an electroerosion cutting machine is provided with a counter-commutator 35 comprising a commutation circuit 36 the input of which is connected to the fifth output of the input memory unit I which is connected also to the illuminators 17 and 25, while the output of the commutation circuit 36 is connected to the inputs of the units 18 and 26 of the sensors 19 and 27 respectively.

The counter-commutator 35 comprises a first pulse shaper-amplifier 37 and a first pulse counter 38 connected in series and a second pulse shaper-amplifier 39 and a second pulse counter 40 also connected in series. The pulse shaper-amplifiers 37 and 39 use well known circuit arrangements producing pulses of the required amplitude and shape at their outputs.

The pulse counters 38 and 40 in this particular case are arranged as four-pulse counting circuits which are also well known. They use ferrite-transistor stages and produce an output after counting up four pulses.

The number of digits in the pulse counters 38 and 40 corresponds to that of the sensors 19 and 27 (and to that of the tracks on the drums 15 and 23). There can be any number of digits depending upon the required resolution in the aparatus.

The inputs of the pulse shaper-amplifiers 37 and 39 are connected to the outputs of the units 18 and 26 of the sensors 19 and 27 respectively. The outputs of the pulse counters 38 and 40 are connected to the inputs of a trigger 41 which has a well known circuit arrangement and is provided with two inputs and one output.

The output of the trigger 41 is connected to the input of a relay 42 commutating the motors and having its two outputs connected to the third inputs of the motor controllers 2 and 3 respectively. Connected to the fourth inputs of the motor controllers is a supplementary output of the high frequency oscillator 34.

FIG. 2 presents a version of the programming apparatus for an electroerosion cutting machine in which a first and a second pulse angular displacement transmitters 43 and 44 are designed as inductive noncontacting transmitters.

The first pulse angular displacement transmitter 43 is provided with four discs 45 arranged parallel to one another and mounted on the roll 10 together with the first position code transmitter 8 and the first motion screw 20 which moves the first jig table along the first coordinate direction.

Made in the circumference of every disc 45 are notches 46. Every disc 45 has a different number of notches. This number depends on the binary code digit to which the given disc 45 corresponds.

The functions of sensors 47 are performed by inductive elements the number of which corresponds to that of the discs 45. In this particular arrangement there are four such elements.

Every sensor 47 has a magnetic gap which alternates its magnetic state when the circumference of the disc 45 moves through the gap of the sensor 47.

The second pulse angular displacement transmitter 44 is also provided with four discs 48 arranged parallel to one another and mounted on the roll 11 together with the second position code transmitter 9 and the second motion screw 28 which moves the second jig table along the second coordinate direction.

Made in the circumference of every disc 48 are notches 49. Every disc 48 has a different number of notches.

The functions of sensors 50 are performed by inductive elements the number of which corresponds to that of the disc 48. In this particular arrangement there are four such discs.

Every sensor 50 has a magnetic gap which alternates its magnetic state when the circumference of the disc 48 moves through this gap.

Assemblies that sense the revolutions of the motion screws 20 and 28 and convert these revolutions into magnetic actions for the first pulse angular displacement sensor 43 and for the second pulse angular displacement sensor 44 are the discs 45 with notches 46 and discs 48 with notches 49 respectively.

There can be any number of sensors 47 and 50 and, accordingly, of the discs 45 and 48 in the apparatus depending upon the required resolution. This number, then, determines the number of digits in the pulse counters 38 and 40 of the counter-commutator 35.

As to the circuit arrangements and the functions performed by all the other units, assemblies and parts of the apparatus presented in FIG. 2, they are absolutely the same as those of the version as presented in the form of a functional diagram in FIG. I and as hereinfore described.

The programming apparatus for an electroerosion cutting machine according to the invention operates in the following manner.

A punched tape carrying the programme is fed in the input memory unit I (FIG. I) through its first input. Every frame of the punched tape contains cyclic code data on the starts and finishes of sectors forming the profile of the piece to be machined, the data on the direction of displacement with respect to both coordinate axes; the binary code data on the tilt angle required for machining tilted sectors of the piece, and the data permitting to select the coordinate axis with respect to which the given tilt angle is selected.

Prior to starting the cutting machine the operator manually sets the jig tables 21 and 29 so that the electrode tool made as a small diameter wire 30 and the piece 33 to be machined are in the immediate vicinity to each other.

Then the operator switches on the input memory unit I which reads the data frame by frame from the punched tape.

If there is data on a sector parallel to the first coordinate axis the first input of the first motor controller 2 will receive an instruction which sets the motor 4 to rotate in the required direction. Simultaneously the first coincidence circuit 6 receives an instruction according to which the first input of the circuit records the cylic code of the finish coordinate for the sector being machined and lying parallel to the first coordinate axis.

The motor 4 rotates, via the reduction gear 12, the first roll 10, and together with the first motion screw 20 it turns the first position code transmitter 8 of the first jig table.

The revolution of the first motion screw 20 makes the first jig table 21 move along the first coordinate axis. The wire 30 starts moving too and cuts the piece 33 along a sector parallel to the first coordinate axis.

The first position code transmitter 8 of the first jig table produces a singal at its output in the course of the jig table displacement which arrives to the second input of the first coincidence circuit 6 and delivers coded data on the current position of the first jig table 21.

In case the codes of the required and the current positions of the first jig table 21 coincide the first coincidence circuit 6 will produce a signal at its output to be fed to the second input of the first motor controller 2 and to the second input of the input memory unit I.

This signal makes the first motor controller 2 switch off the motor 4 and stop the first jig table 21.

Under the effect of this signal the input memory unit I delivers the next instruction to the first input of the second motor controller 3 which sets the motor 5 rotating in the required direction. Simultaneously the first input of the second coincidence circuit 7 receives data on the next coordinate of the finish of the next sector to be machined in parallel to the second coordinate axis.

The motor 5 rotates, via the reduction gear 13, the second roll II, and together with the second motion screw 28 turns the second position code transmitter 9 of the second jig table.

The revolution of the second motion screw 28 makes the second jig table 29 move along the second coordinate direction. The piece 33 being machined starts moving too and the wire 30 cuts the piece 33 along a sector parallel to the second coordinate axis.

The second position code transmitter 9 of the second jig table produces a signal at its output in the course of the jig table displacement which arrives to the second input of the second coincidence circuit 7 and delivers coded data on the currant position of the second jig table 29.

In case the codes of the required and the present position of the second jig table coincide the second coincidence circuit 7 will produce a signal at its output to be fed to the second input of the second motor controller 3 and to the third input of the input memory unit I.

The signal makes the second motor controller 3 switch off the motor 5 and stop the second jig table 29.

Under the effect of this signal the input memory unit I delivers the next instruction.

In case the next sector to be machined is tilted with respect to the coordinate axes the fifth output of the input memory unit I will deliver an instruction to switch on the illuminators 17 and 25. The same instruction arrives to the commutation circuit 36 that enables all four sensors 19 in the unit 18 and such a number of the sensors 27 in the input 19 and in such a combination which correspond to the code of the tilt angle of the sector being machined with respect to the corresponding coordinate axis.

Simultaneously the first input of the first motor controller 2 receives the first command which sets the first motor 4 in operation and the motor starts moving the first jig table 21. The rotation of the roll 10 turns the first position code transmitter 8 of the first jig table and the drum 15 of the first pulse angular displacement transmitter 14.

The holes 16 making the tracks of this drum 15 are arranged so that when the first jig table shifts through a minimum distance along the first coordinate axes all four holes 16 will pass by the four sensors 19. Four pulses produced by the sensors 19 arrive to the input of the first shaper-amplifier 37 to be fed then to the input of the first pulse counter 38. As soon as the fourth pulse arrives the output of the pulse counter 38 will produce a signal which operates the relay 42 via the trigger 41. The operation of this relay 42 disables the first motor controller 2 and enables the second motor controller 3.

The second motor 5 starts rotating the roll II and shifting the second jig table and turning both the second position code transmitter 9 of the second jig table and the drum 23 of the second pulse angular displacement transmitter 22.

Depending upon the number and combination of the sensors 27 in the unit 26 the four holes 24 of the drum 23 will pass by the sensors 27 at different displacements of the jig table 29 along the second coordinate direction. When all sensors 27 are enabled the jig table 29 will go through the minimum displacement. When only the first sensor 27 is enabled, the one which is opposite the track where the intervals between holes is the greatest among the rest of the tracks on the drum 23, the displacement of the second jig table 29 will be maximum.

The enabled sensors 27 react to the action of the visible light passing through the holes 24 and produce electric pulses. According to the arrangement when the pulse counter 40 receives four such pulses its output will produce a signal which operates the relay 42 via the trigger 41. The relay 42 disables the second motor controller 3 and again enables the first motor controller 2.

The procedure is repeated until the present positions of the jig tables 21 and 29 coincide with the positions as required according to the programme and as specified by the code of the finish point of the tilted sector being machined.

The coincidence of the above positions will result in the operation of the coincidence circuits 6 and 7 and the inputs of the input memory unit I will receive signals to start reading the next programme frame and to produce the next instruction.

The programming apparatus for an electroerosion cutting machine presented in FIG. 2 operates in a similar manner, the only difference being that it is not the visible light actions that make the sensors 47 and 50 represented by inductive elements produce electric pulses, but the alterations of the magnetic state of these elements which occur when the notches 46 and 49 on the circumferences of the discs 45 and 48 pass through the magnetic gaps of the sensors 47 and 50.

In case of a short circuit in the spark gap the wire 30 will move in the direction opposite to its operating displacement due to a signal applied from the output of the high frequency oscillator 34 either to the fourth input of the first motor controller 2 or to the fourth input of the second motor controller 3. This signal reverses the respective motor (4 or 5).

The proposed programming apparatus can be used to control electroerosion cutting machines using unshaped wire-electrodes and making it possible to cut a blank of any conducting or semi-conductor material such as metals, alloys and hard ceramic metal alloys into complex shape pieces.

The proposed programming apparatus can be used with any twin-jig machines intended for manufacturing tools in the engineering, electrical, radio, instrument and electronics industries. It can also be used to control servomotors in twin-jig metal cutting machines (turning and milling machines) employed for manufacturing shaped pieces with profiles consisting of both sectors parallel to the coordinate axes and sectors tilted with respect to the latter.

A major advantage of the programming apparatus which promotes its wide use with electroerosion cutting machines consists in that it makes it possible to automatically machine the sectors of a piece that are tilted with respect to the coordinate axes. In this case the programme carrier has to contain only the coordinates of the start and finish points and the tilt angle of the sector with respect to the corresponding coordinate axis.

Thus, expensive interpolators can be dispensed with while the programme recorded on a punched tape and inserted in the apparatus can be substantially reduced in volume.

Due to the fact that the need to read the programme dealing with the coordinates of intermediate points of piece sectors tilted with respect to the axes is eliminated it becomes possible to reduce both the time required to prepare the programme itself and the time required to machine the pieces. Thus, it becomes possible to raise the productivity of electroerosion cutting machines equipped with such programming apparatus.

Moreover, the use of the programming device permits to increase the rate of parts machining, which must be attributed to the noncontacting pulse angular displacement transmitters 14, 22 in FIG. I and 43, 44 in FIG. 2 and to the counter-commutator 35 which increase also the reliability of the machine.

The use of the pulse high frequency oscillator 34 allows to machine metal pieces using the given electroerosion cutting machine in running water instead of in such expensive liquids as kerosine and solar oil.

And finally, the programming apparatus can operate in a semi-automatic mode in which sectors between two points can be machined automatically while the coordinates of these points are introduced with the help of switches on the input memory unit I.

What is claimed is:

1. A programming device for an electroerosion cutting machine with first and second jig tables displaced by first and second motion screws comprising: an input memory unit with three inputs and five outputs, said first input serving to receive the programme carrier; a first motor controller with four inputs and one output, said first input being connected to said first output of said input memory unit; a second motor controller with four inputs and one output, said first input being connected to said second output of said memory unit; a first coincidence circuit with a first and a second inputs and one output, said first input connected to said third output of said input memory unit and said output being connected to said second input of said first motor controller and to said second input of said input memory unit; a second coincidence circuit with a first and a second inputs and an output, said first input being connected to said fourth output of said input memory unit and said output being connected to said second input of said second motor controller and to said third input of said input memory unit; a first motor the input of which is connected electrically to said output of said first motor controller; a second motor the input of which is connected electrically to said output of said second motor controller; a first position code transmitter of said first jig table input of which is coupled mechanically to the output of said motor while the output is connected electrically to said second input of said first coincidence circuit; a second position code transmitter of said second jig table the input of which is coupled mechanically to the output of said second motor while the output is connected electrically to said second input of said second coincidence circuit; a first pulse angular displacement transmitter with an input and an output for electrical signals which is coupled mechanically to said output of said first motor; a second pulse angular displacement transmitter with an input and an output for electrical signals which is coupled mechanically to said output of said second motor; said output of said first motor rotating said first position code transmitter of the first jig table and the first pulse angular displacement transmitter is coupled mechanically to said first motion screw which moves said first jig table; said output of said second motor rotating said second position code transmitter of the second jig table and the second pulse angular displacement transmitter is coupled mechanically to said second motion screw which moves said second jig table; an element of said first pulse angular displacement transmitter sensing the revolutions of said first motion screw and converting then into actions; sensors of said first pulse angular displacement transmitter which react to said actions of said element of said first angular displacement transmitter sensing the revolutions of said first motion screw, the number of said actions produced by said element of the first pulse angular displacement transmitter as per every revolution of said first motion screw being different for everyone of said sensors that react to these actions; an element of said second pulse angular displacement transmitter sensing the revolutions of said second motion screw and converting them into actions; sensors of said second pulse angular displacement transmitter reacting to said actions of said element of said second pulse angular displacement transmitter sensing the revolutions of said second motion screw, the number of said actions produced by said element of said second pulse angular displacement transmitter as per every revolution of said second motion screw being different for everyone of said sensors reacting to these actions; a counter-commutator; a first shaper-amplifier of pulses of said counter-commutator, the input of which is connected to the output of all said sensors of said first pulse angular displacement transmitter; a second shaper-amplifier of pulses of said counter-commutator the input of which is connected to the output of all said sensors of said second pulse angular displacement transmitter; a first pulse counter of said counter-commutator the number of digits in which corresponds to the number of said sensors of said first pulse angular displacement transmitter and the input of which is connected to the output of said first pulse amplifier-shaper; a second pulse counter of said counter-commutator the number of digits in which corresponds to the number of said sensors of said second pulse angular displacement transmitter and the input of which is connected to the output of said second pulse shaper-amplifier; a trigger of said counter-commutator with a first and a second inputs and an output, said first input being connected to the output of said first pulse counter and said second input being connected to the output of said second pulse counter; a relay of said counter-commutator with a first and a second outputs and an input connected to said output of said trigger, the first output of said relay being connected to the third input of said first motor controller and the second output of said relay being connected to the third input of said second motor controller; a commutation circuit of said counter-commutator the input of which is connected to the fifth output of said input memory unit and the output of which is connected to the inputs of all said sensors.

* * * * *